United States Patent

Eder et al.

[11] Patent Number: 5,186,544
[45] Date of Patent: Feb. 16, 1993

[54] WIPER UNIT FOR A LINEAR BEARING ELEMENT

[75] Inventors: Jean M. Eder, Woerth, France; Hans-Reinhard Lambertz, Erkrath; Hartmut Koschmieder, Erlangen, both of Fed. Rep. of Germany

[73] Assignee: INA Walzlager Schaeffler KG, Fed. Rep. of Germany

[21] Appl. No.: 876,482

[22] Filed: Apr. 30, 1992

[30] Foreign Application Priority Data

May 7, 1991 [DE] Fed. Rep. of Germany ....... 4114892

[51] Int. Cl.⁵ .................................................. F16C 29/08
[52] U.S. Cl. ............................................................ 384/15
[58] Field of Search .................... 384/15, 16, 45, 43, 384/44; 464/168

[56] References Cited

U.S. PATENT DOCUMENTS

| 4,850,720 | 7/1989 | Osawa | 384/15 |
| 4,886,376 | 12/1989 | Osawa | 384/15 |
| 4,921,358 | 5/1990 | Kasuga et al. | 384/15 |
| 4,963,038 | 10/1990 | Asano et al. | 384/45 |

Primary Examiner—Lenard A. Footland
Attorney, Agent, or Firm—Bierman and Muserlian

[57] ABSTRACT

Wiper unit for a bearing element, preferably a rolling bearing element, which is slidably mounted on the running surface of a shaped part and at least one of its front ends comprising a wiper blade retained by a supporting plate and whose one end region is in contact with the running surface for cleaning the same, characterized in that the wiper blade (5) comprises several flexible tongues (9 to 11) which lie in one comon plane before the mounting of the wiper unit on the bearing element (1) and whose ends are in resilient contact with respective sections of the running surface of the shaped part (2) in the assembled state.

9 Claims, 3 Drawing Sheets

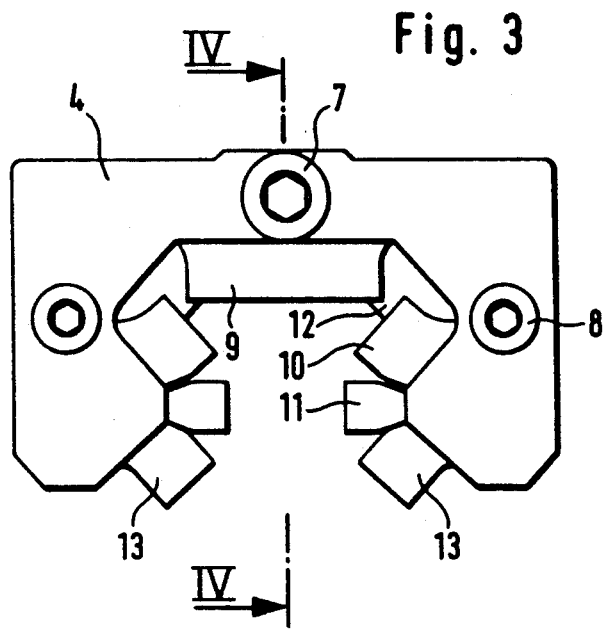
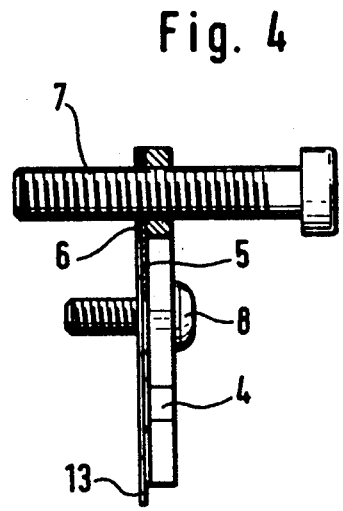
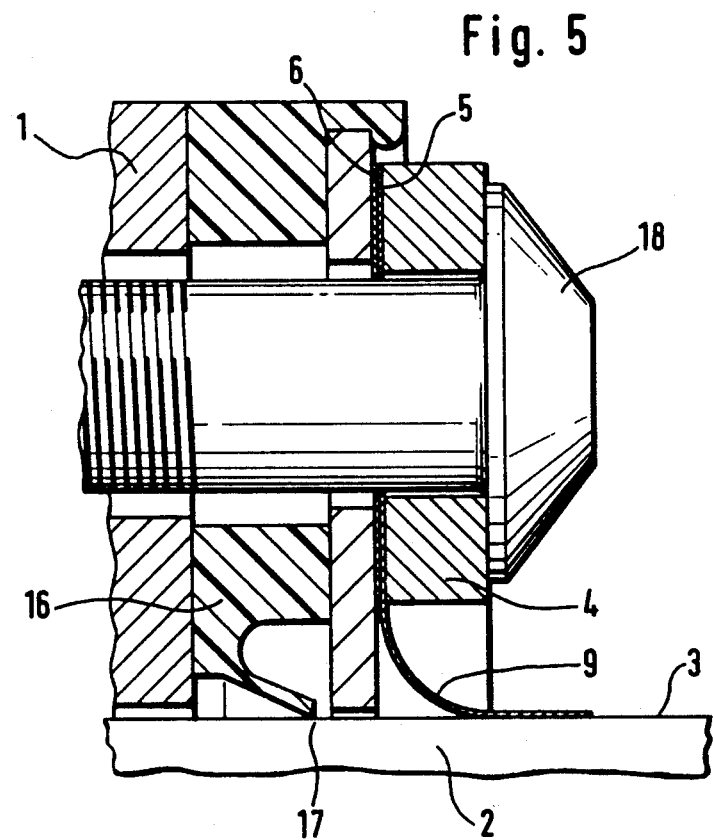

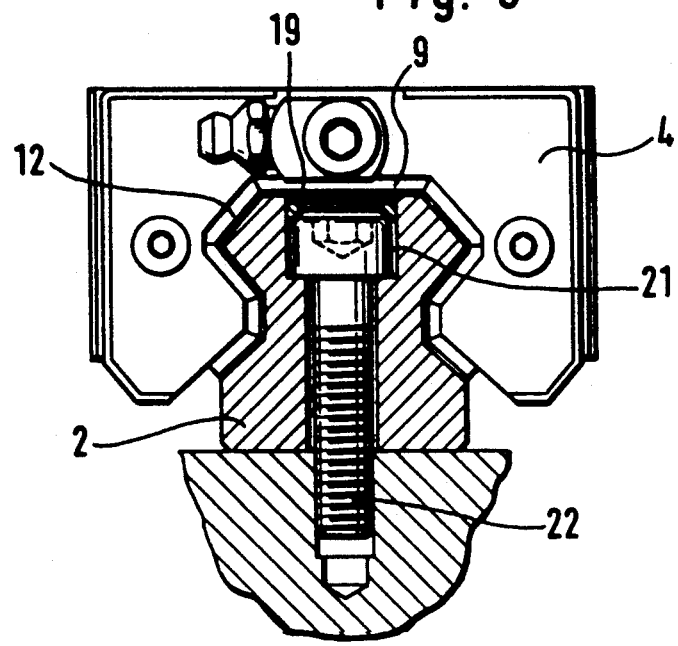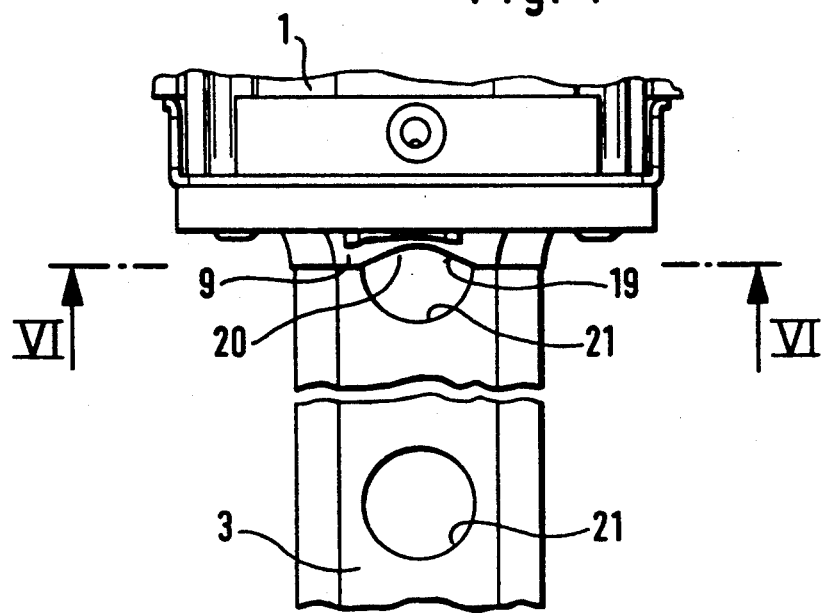

WIPER UNIT FOR A LINEAR BEARING ELEMENT

STATE OF THE ART

A wiper a bearing element, preferably a rolling bearing element, which is slidably mounted on the running surface of a shaped part and at least one of its front ends comprises a wiper blade which is retained by a supporting plate and whose one end region is in contact with the running surface for cleaning the same is known. DE-PS 2,130,420 describes a wiper unit for a bearing element which permits a constantly dosed lubrication of the rolling bearing by simple and inexpensive means. This device comprises a wiper made of a polymeric material with a wiping edge which is intended to clean the running surface during the reciprocating motion of a bearing element made in the form of a recirculating roller shoe and thus keep away impurities from the rolling bearing. For example, the shaped part can be designed as a profiled rail and the shape of the elastomer wiper can be adapted to the shape of the profiled rail and its running surface. The wiper tongues thus formed have to be protected from hot chips and coarse, hard dirt particles by a further metal gap seal placed in front of them which surrounds the profiled rail with a narrow gap. In this case, the gap seal has to be adapted to the shape of the profiled rail.

This design has the disadvantage that it cannot prevent small abrasive and/or hot particles from getting to the sealing wiper lips, destroying them and thus leading to the failure of the bearing. Such particles are chips which are produced during the operation of the machine tool of which the bearing element is a part. A further problem arises with linear guidance systems in applications in which a hard dirt crust is formed on the running surface of the rail during the work process which cannot be scraped off by the soft elastomer or rubber sealing lips. In such cases, adjoining metal wipers in the form of individual elements are arranged on each raceway but, with a complicated shape of the profiled rail, they do not offer an efficient solution for the problematic sealing at the corners, and their mounting is also very complicated.

U.S. Pat. No. 1,938,786 describes a wiper unit of the type initially described whose wiper blade has an angular cross-section and which is retained in a receiving space formed between the bearing element and the supporting plate screwed onto the bearing element with interposition of spacer rings. This wiper blade is not fixed but retained movable within narrow limits and pressed against the running surface by a group of coiled springs. This is a complicated construction.

OBJECTS OF THE INVENTION

It is an object of the invention to provide a sealing wiper unit for a linear bearing, which is effective against hot chips and fine particles and which can moreover scrap off hard crust from the running surface and also effectively clean the surfaces of shaped parts comprising localized recesses like bores which are not flush with the surface, without destruction of the wiper blade.

Another object of the invention is to provide a wiper unit which is inexpensive to manufacture and easy to mount.

These and other objects and advantages of the invention will become obvious from the following detailed description.

THE INVENTION

The wiper unit of the invention for a bearing element, preferably a rolling bearing element, which is slidably mounted on the running surface of a shaped part and at least one of its front ends comprising a wiper blade which is retained by a supporting plate and whose one end region is in contact with the running surface for cleaning the same, is characterized in that the wiper blade (5) comprises several flexible tongues (9 to 11) which lie in one common place before the mounting of the wiper unit on the bearing element (1) and whose ends are in resilient contact with respective sections of the running surface of the shaped part (2) in the assembled state.

It is also possible to arrange at least two wiper blades in contact with each other on the side of the supporting plate facing the bearing element so that in the flat state, their tongues partially overlap one another or form gaps, and in the assembled state, when pushed onto the shaped part, they form one common closed profile. In this way, a reliably working wiper unit which is leak-tight in operation is obtained by simple means.

The supporting plate and the wiper blades can be glued together so that for mounting, they form one common component which is easy to manipulate. This gluing together can be effected by coating each wiper blade on one side with an adhesive foil. The mounting of the wiper unit on the bearing element is accomplished by the simple means consisting of providing aligned bores on the supporting plate and the wiper blades and inserting screws into the bores for the fixing to the bearing element. The wiper unit can thus be screwed onto the bearing element without any problem.

During mounting, a lubricating nipple support can be fixed at the same time to the supporting plate by one of the screws so that it is possible to supply the required lubricant to the bearing element for its reciprocating motion on the running surface of the shaped part by means of a lubricating nipple attached to the lubricating nipple support. For the further sealing of liquid or pasty media, an additional wiper made of a polymeric material and comprising a wiping edge can be arranged on the wiper blade adjoining the bearing element.

If, when working with shaped parts comprising localized recesses, e.g. bores which are not absolutely flush with the running surface, the pretensioned tongue end has a rectilinear shape which gets partly pressed into the recess and on moving further, it can get caught at the bore edge. The result is a destruction of the tongue. In such cases, it is necessary to design the tongue end so that it cannot sink into the empty space (the bore) when passing over the recess and this can be achieved by the invention by a concave contour of the tongue edge.

Referring now to the drawings:

FIG. 3 is a cross-section of a wiper unit with two wiper blades and screws for the fixing to the bearing element;

FIG. 4 is a section through the wiper unit of FIG. 3 along line IV—IV;

FIG. 5 is an enlarged partial cross-section through another wiper unit fixed to a bearing element;

FIG. 6 is a cross-section of a bearing element of FIG. 1 with a concave recess in its upper tongue;

FIG. 7 is a top view of the bearing element of FIG. 6.

Figure 1:
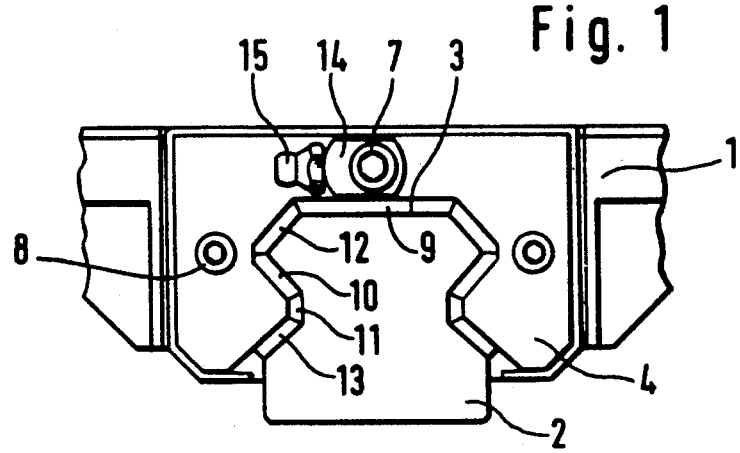
FIG. 1 is a cross-section of a bearing element arranged on a shaped part and provided with a wiper unit at one front end.
Figure 2:
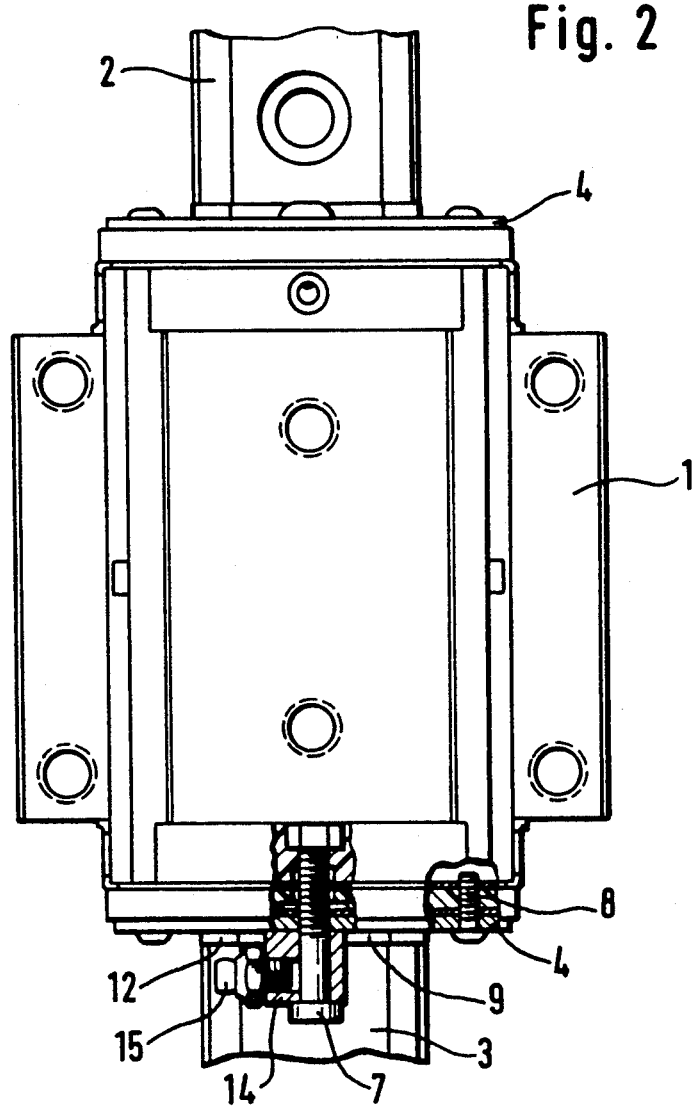
FIG. 2 is a top view of the bearing element of FIG. 1.

The wiper unit of FIGS. 1 to 4 is mounted on a bearing element 1 designed as a carriage which surrounds a shaped part 2 in the form of a guide rail in the region of the running surface 3 thereof. The wiper unit comprises a supporting plate 4, a wiper blade 5 glued on one side to this plate and a wiper blade 6 glued to the wiper blade 5. The supporting plate 4 and the wiper blades 5 and 6 have aligned bores. For mounting, screws 7 and 8 are inserted through these bores and screwed into threaded bores of the bearing element, both wiper blades 5 and 6 being located between the supporting plate 4 and the bearing element 1.

Each of the wiper blades comprises several tongues directed towards the shaped part 2 which are intended to clean the sections of the running surface 3 of the shaped part during operation. The wiper blade 5 comprises tongues 9, 10 and 11 while the wiper blade 6 comprises tongues 12 and 13. In the pre-mounted state of the wiper unit, the tongues of the two blades form gaps between them or partially overlap one another and in this state, the wiper blades 5 and 6 with their tongues 9 to 11 and, 12 and 13 respectively, are situated each in a different plane. After the mounting of the wiper unit on the bearing element 1 and the subsequent pushing of the bearing element 1 onto the shaped part 2, the ends of all the tongues touching the running surface 3 of the shaped part 2 have bent elastically through 90° C. so that these tongue ends are resiliently supported on the sections of the running surface 3, and during the reciprocating motion of the bearing element 1, they free the running surface 3 of impurities. By the elastic deformation of the tongues, one common closed profile has been formed. Neither the overlaps nor the gaps exist any more because the tongues are dimensioned to correspond to the cross-sectional shape of the shaped part 2 in their sealing position. In the example of the embodiment of FIGS. 1 to 4, the screw 7 is longer than the screw 8 so that with its help a lubricating nipple support 14 for a lubricating nipple 15 can also be fixed to the bearing element 1.

The example of the embodiment of FIG. 5 comprises in addition to the supporting plate 4 and the wiper blades 5 and 6, a polymeric wiper 16 whose wiping edge 17 slides along the respective section of the running surface 3 of the shaped part 2. This wiper 16 is situated between the bearing element 1 and the wiper unit. The supporting plate 4, the wiper blades 5 and 6 and the polymeric wiper 16 are fixed by screws 18 to the bearing element 1.

In the example of the embodiment of FIGS. 6 and 7, the wiping edge 19 of the upper tongue 9 is not rectilinear but the tongue 9 comprises a recess 20 in the region of its end in contact with the running surface 3. This portion of the tongue is concave so that when passing over bores 21 provided for fixing screws 22 in the shaped part 2, the tongue end cannot get pressed into the bore 21 concerned.

Various modifications of the wiper unit of the invention may be made without departing from the spirit or scope thereof and it is to be understood that the invention is intended to be limited only as defined in the appended claims.

What we claim is:

1. A wiper unit for a bearing element which is slidably mounted on the running surface of a shaped part and at least one of its front ends comprising a wiper blade retained by a supporting plate and whose one end region is in contact with the running surface for cleaning the same, characterized in that the wiper blade (5) comprises several flexible tongues (9 to 11) which lie in one common plane before the mounting of the wiper unit on the bearing element (1) and whose ends are in resilient contact with respective sections of the running surface of the shaped part (2) in the assembled state.

2. A wiper unit of claim 1 wherein at least two wiper blades (5,6) are arranged in contact with each other on the side of a supporting plate (4) facing the bearing element (1) whereby in the flat state, their tongues (9 to 13) partially overlap one another or form gaps, and in the assembled state, when pushed onto the shaped part (2), they form one common closed profile.

3. A wiper unit of claim 2 wherein the supporting plate (4) and the wiper blades (5,6) are glued together to facilitate mounting.

4. A wiper unit of claim 3 wherein each wiper blade (5,6) is coated on one side with an adhesive foil.

5. A wiper unit of claim 1 wherein a supporting plate (4) and the wiper blades (5,6) are provided with aligned bores into which screws (7,8,18) for the fixing to the bearing element (1) are inserted.

6. A wiper unit of claim 5 wherein a lubricating nipple support (14) is fixed at the same time by one of the screws (7) to the supporting plate (4).

7. A wiper unit of claim 1 wherein an additional wiper (16) made of a polymeric material and comprising a wiping edge (17) is arranged on the wiper blade (6) adjoining the bearing element (1).

8. A wiper unit of claim 1 wherein the wiping edge (19) of the tongues (9 to 13) is rectilinear in shape.

9. A wiper unit of claim 1 wherein the wiping edge of one of the tongues (9) is partly concave in shape.

* * * * *